United States Patent
Takezawa

(10) Patent No.: US 9,124,204 B2
(45) Date of Patent: Sep. 1, 2015

(54) INVERTER DEVICE

(75) Inventor: Ryuichi Takezawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/386,945

(22) PCT Filed: May 18, 2012

(86) PCT No.: PCT/JP2012/062817
§ 371 (c)(1),
(2), (4) Date: Sep. 22, 2014

(87) PCT Pub. No.: WO2013/171899
PCT Pub. Date: Nov. 21, 2013

(65) Prior Publication Data
US 2015/0048767 A1 Feb. 19, 2015

(51) Int. Cl.
*H02P 27/00* (2006.01)
*H02P 6/14* (2006.01)
*H02M 7/217* (2006.01)
*H02P 29/02* (2006.01)
(Continued)

(52) U.S. Cl.
CPC ............. *H02P 6/14* (2013.01); *H02M 7/217* (2013.01); *H02P 4/00* (2013.01); *H02P 29/021* (2013.01); *H02M 7/48* (2013.01); *H02M 2001/0006* (2013.01); *H02M 2001/007* (2013.01)

(58) Field of Classification Search
CPC ............. H02M 1/00; H02J 1/00; B60L 1/00; B60L 2200/00
See application file for complete search history.

(56) References Cited

U.S. PATENT DOCUMENTS 6,795,322 B2   9/2004   Aihara et al.
7,053,502 B2   5/2006   Aihara et al.
(Continued)

FOREIGN PATENT DOCUMENTS

JP   58-139675 A     8/1983
JP   2000-014002 A   1/2000
(Continued)

OTHER PUBLICATIONS

International Search Report for PCT/JP2012/062817 dated Aug. 21, 2012.

*Primary Examiner* — Shawki S Ismail
*Assistant Examiner* — Zoheb Imtiaz
(74) *Attorney, Agent, or Firm* — Sughrue Mion, PLLC; Richard C. Turner

(57) ABSTRACT

An inverter device includes a rectifier circuit that rectifies alternating-current power supplied from a main power supply and generates direct-current power, a control power supply circuit that generates direct-current power for control using at least one of the generated direct-current power and direct-current power supplied from an external power supply, and a control unit that receives the generated direct-current power for control and performs a predetermined control operation. The control power supply circuit includes an insulation transformer including a primary side and second side winding wires, a first control power supply capacitor connected to the secondary side winding wire via a first diode, an external power supply capacitor connected to the first control power supply capacitor via a second diode and connected to a terminal, to which the external power supply is connected, via a third diode, and a second control power supply capacitor connected to the external power supply capacitor.

6 Claims, 10 Drawing Sheets

(51) Int. Cl.
  *H02P 4/00*   (2006.01)
  *H02M 7/48*   (2007.01)
  *H02M 1/00*   (2007.01)

(56)          References Cited

U.S. PATENT DOCUMENTS

2007/0075585 A1   4/2007 Matsuda et al.
2010/0072953 A1*  3/2010 Mitsutani .................... 320/152
2010/0141213 A1*  6/2010 Iida ............................. 320/134
2012/0326667 A1* 12/2012 Ito et al. ...................... 320/109
2014/0203735 A1*  7/2014 Sugiyama et al. ............ 318/139
2014/0225441 A1*  8/2014 Mizuno et al. ................. 307/66

FOREIGN PATENT DOCUMENTS

JP    2000-197347 A   7/2000
JP    2001-114482 A   4/2001
JP    2006-033997 A   2/2006
JP    2007-236134 A   9/2007
WO    2004/107551 A1 12/2004

* cited by examiner

INVERTER DEVICE

CROSS REFERENCE TO RELATED APPLICATIONS

This application is a National Stage of International Application No. PCT/JP2012/062817 filed May 18, 2012, the contents of all of which are incorporated herein by reference in their entirety.

FIELD

The present invention relates to an inverter device.

BACKGROUND

Patent Literature 1 discloses that, in a gate power supply device that supplies a gate power supply to a gate driving circuit for applying a gate voltage to a semiconductor device, a gate power self-supply circuit receives an off-time voltage of the semiconductor device, resistance-divides the voltage, and charges the voltage in a capacitor to self-supply the gate power supply and, when the off-time voltage of the semiconductor device drops and the gate power self-supply circuit cannot accumulate charges enough for maintaining a gate voltage in the capacitor, a backup power supply circuit receives the voltage of the gate power self-supply circuit, resistance-divides the voltage, and charges the voltage in the capacitor of the gate power self-supply circuit via a diode. Consequently, according to Patent Literature 1, the gate voltage can be supplied to the gate driving circuit of the semiconductor device of itself from the backup power supply circuit even if an external power supply is not provided. Therefore, when a plurality of the semiconductor devices are connected in parallel, it is possible to secure the gate power supply even if one semiconductor device fails due to short circuit.

Patent Literature 2 discloses that, in an inverter device, a commercial power supply is connected to an inverter main body, a parameter unit is connected to the inverter main body via a parameter communication cable, and an external power supply unit is connected to the parameter unit. Consequently, according to Patent Literature 2, even in a state in which the commercial power supply cannot be input during the start of the inverter main body, it is possible to check and change setting values.

CITATION LIST

Patent Literature

Patent Literature 1: Japanese Patent Application Laid-Open No. 2007-236134
Patent Literature 2: WO 2004/107551

SUMMARY

Technical Problem

The technology of Patent Literature 1 is based on the premise that an external power supply is not provided. Therefore, there is no description concerning how both of power supply by a main power supply and power supply by an external power supply are achieved.

Patent Literature 2 also mentions that an external-power-supply-unit connecting connector is provided in the inverter main body and the external power supply unit is connected to the external-power-supply-unit connecting connector. However, there is no description concerning how the external-power-supply-unit connecting connector and a circuit, to which the commercial power supply (the main power supply) is connected, are connected. There is no description either concerning how both of power supply by the main power supply and power supply by the external power supply are achieved.

The present invention has been devised in view of the above and it is an object of the present invention to obtain an inverter device that can achieve both of power supply by a main power supply and power supply by an external power supply in a power-saving and efficient manner.

Solution to Problem

To solve the above problems and achieve the object, an inverter device according to one aspect of the invention includes: a rectifier circuit that rectifies alternating-current power supplied from a main power supply and generates direct-current power; a control power supply circuit that generates direct-current power for control using at least one of the generated direct-current power and direct-current power supplied from an external power supply; and a control unit that performs a predetermined control operation using the generated direct-current power for control. The control power supply circuit includes: an insulation transformer including a primary side winding wire connected to the rectifier circuit and a secondary side winding wire insulated from the primary side winding wire; a first control power supply capacitor connected to the secondary side winding wire of the insulation transformer via a first diode; an external power supply capacitor connected to the first control power supply capacitor via a second diode and connected to a terminal, to which the external power supply is connected, via a third diode; and a second control power supply capacitor connected to the external power supply capacitor.

Advantageous Effects of Invention

According to the present invention, it is possible to separate the power supply by the main power supply and the power supply by the main power supply and the external power supply, to reduce the supplied power of the external power supply, and attain power saving. Because a capacitor can be divided into the control power supply capacitors and the external power supply capacitor, it is possible to reduce the capacity of the external power supply capacitor. Because it is possible to reduce a rush current from the external power supply to the external power supply capacitor, it is possible to efficiently suppress the rush current without providing a resistor. Therefore, it is possible to achieve both of power supply by the main power supply and power supply by the external power supply in a power-saving and efficient manner.

DESCRIPTION OF EMBODIMENTS

Embodiments of an inverter device according to the present invention are explained in detail below with reference to the drawings. Note that the present invention is not limited by the embodiments.

First Embodiment

Figure 9:
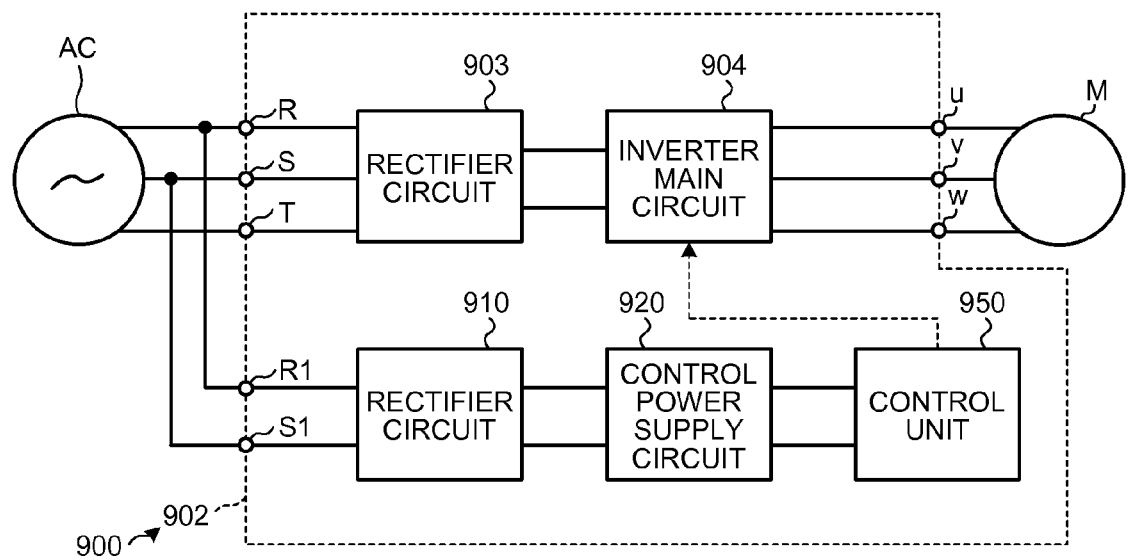
FIG. 9 is a diagram of the configuration of an inverter device according to a basic mode.

Before an inverter device 1 according to a first embodiment is explained, an inverter device 900 according to a basic mode is explained with reference to FIG. 9. FIG. 9 is a diagram of the configuration of the inverter device 900 according to the basic mode.

The inverter device 900 receives alternating-current power from a main power supply AC, converts the received alternating-current power into predetermined direct-current power, then further converts the converted direct-current power into alternating-current power, and drives a motor M using the thus converted alternating-current power. Note that the main power supply AC is, for example, an AC 200 volts/400 volts alternating-current power supply.

Specifically, the inverter device 900 includes a rectifier circuit 903, an inverter main circuit 904, a rectifier circuit 910, a control power supply circuit 920, and a control unit 950. The rectifier circuit 903, the inverter main circuit 904, the rectifier circuit 910, the control power supply circuit 920, and the control unit 950 are arranged in, for example, a housing 902 of the inverter device 900.

The rectifier circuit 903 receives, for example, alternating-current power of three phases (an R phase, an S phase, and a T phase) from the main power supply AC via input terminals R, S, and T on the housing 902. The rectifier circuit 903 rectifies and smoothes the alternating-current power and generates direct-current power. The rectifier circuit 903 includes, for example, a plurality of bridge-connected diodes (not shown in the figure), rectifies the alternating-current power using the diodes, and generates the rectified direct-current power. The rectifier circuit 903 includes, for example, a smoothing capacitor (not shown in the figure), smoothes the rectified direct-current power using the smoothing capacitor, and generates the smoothed direct-current power. The rectifier circuit 903 supplies the generated direct-current power to the inverter main circuit 904.

The inverter main circuit 904 receives the direct-current power from the rectifier circuit 903. The inverter main circuit 904 converts the direct-current power into, for example, alternating-current power of three phases (a U phase, a V phase, and a W phase) under the control by the control unit 950. The inverter main circuit 904 includes, for example, a plurality of switching elements corresponding to the three phases (the U phase, the V phase, and the W phase) and turns on and off the switching elements respectively at predetermined timings to convert the direct-current power into, for example, alternating-current power of the three phases (the U phase, the V phase, and the W phase). The inverter main circuit 904 supplies the converted alternating-current power to the motor M via output terminals U, V, and W on the housing 902 to drive the motor M.

Figure 10:
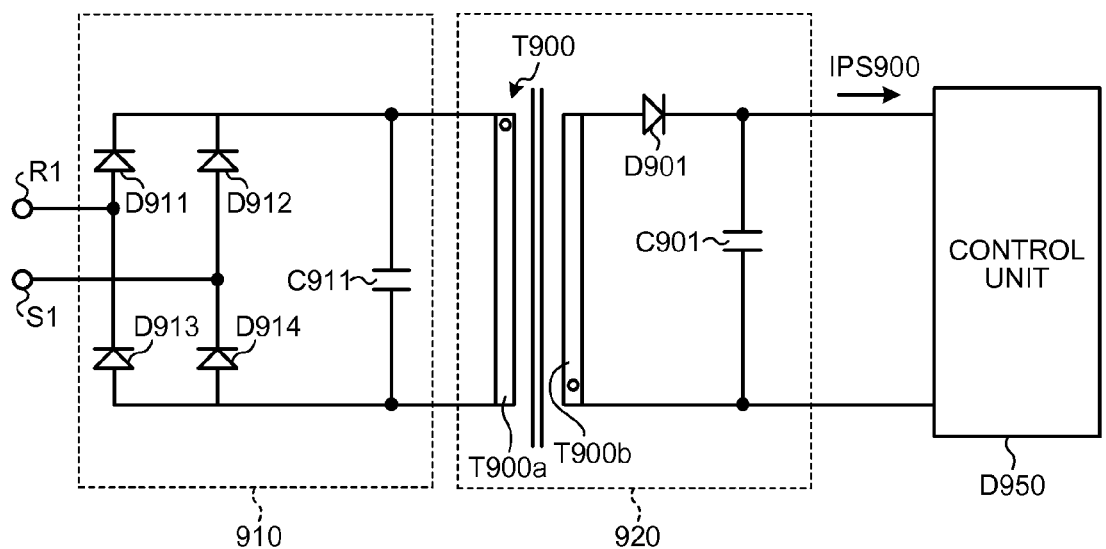
FIG. 10 is a diagram of the configuration of a rectifier circuit and a control power supply circuit in the basic mode.

In this case, the inverter device 900 internally generates a control power supply for causing the control unit 950 to operate. That is, the rectifier circuit 910 receives, for example, alternating-current power of two phases (the R phase and the S phase) from the main power supply AC via input terminals R1 and S1 on the housing 902. The rectifier circuit 910 rectifies and smoothes the alternating-current power and generates direct-current power. The rectifier circuit 910 includes, for example, as shown in FIG. 10, a plurality of bridge-connected diodes D911 to D914, rectifies the alternating-current power using the diodes D911 to D914, and generates rectified direct-current power. The rectifier circuit 910 includes, for example, as shown in FIG. 10, a smoothing capacitor C911 at a post stage of the rectifier circuit 910, smoothes the direct-current power using the smoothing capacitor C911, and generates the smoothed direct-current power. The rectifier circuit 910 supplies the generated direct-current power to the control power supply circuit 920.

The control power supply circuit 920 receives the direct-current power from the rectifier circuit 910. The control power supply circuit 920 transforms the direct-current power and generates direct-current power for control. The control power supply circuit 920 includes, for example, as shown in FIG. 10, an insulation transformer T900 including a primary side winding wire T900a connected to the rectifier circuit 910 and a secondary side winding wire T900b insulated from the primary side winding wire T900a. For example, the insulation transformer T900 transforms (steps down) the direct-current power according to a turn ratio of the primary side winding wire T900a and the secondary side winding wire T900b and generates transformed direct-current power. The control power supply circuit 920 includes, for example, as shown in FIG. 10, a control power supply capacitor C901 connected to the secondary side winding wire T900b via a diode D901. The control power supply capacitor C901 receives the direct-current power from the secondary side winding wire T900b via the diode D901 and accumulates charges corresponding to the received direct-current power. The control power supply capacitor C901 supplies electric power corresponding to the accumulated charges to the control unit 950 as direct-current power IPS900 for control.

The control unit 950 receives the direct-current power IPS900 for control from the control power supply circuit 920. The control unit 950 performs a predetermined control operation using the direct-current power IPS900 for control. For example, the control unit 950 receives a speed command from the outside (e.g., a host controller), performs PWM control for causing the inverter main circuit 904 to operate such that the motor M operates according to the motor command, and generates a control signal. The control unit 950 supplies the generated control signal to control terminals of the switching elements in the inverter main circuit 904 to thereby turn on and off the switching elements at respective predetermined timings such that the motor M operates according to the speed command.

In this way, in the inverter device 900 according to the basis mode, a control power supply (i.e., the direct-current power IPS900 for control) in the inverter device 900 cannot be established unless power supply by the main power supply (AC 200 volts/400 volts) is performed. Therefore, when the power supply by the main power supply is stopped, for example, when a power failure occurs, it is likely that the control operation cannot be performed by the control unit 950 and it is made difficult to safely stop the motor M. Alternatively, when the power supply by the main power supply becomes unstable because of an instantaneous voltage drop or the like, it is likely that the control operation by the control unit 950 also becomes unstable and it is made difficult to cause the motor M to safely operate.

Figure 11:
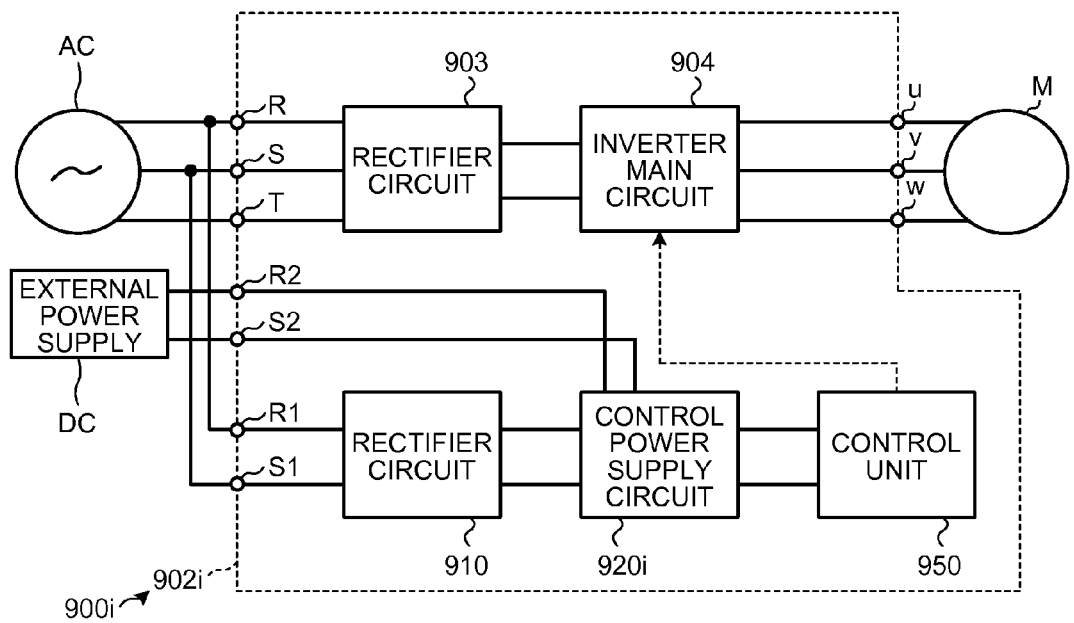
FIG. 11 is a diagram of the configuration of an inverter device according to a modification of the basic mode.

On the other hand, the inventor of the present invention considered that, by performing power supply by an external power supply (e.g., DC 24 volts) in addition to power supply by a main power supply (e.g., AC 200 volts/400 volts), that is, by achieving both of the power supply by the main power supply and the power supply by the external power supply, it is possible to establish control power even when the power supply by the main power supply is stopped or when the power supply by the main power supply becomes unstable. The inventor examined an inverter device 900i obtained by improving the inverter device 900 according to the basic mode such that an external power supply DC can be connected to the inverter device 900i as shown in FIG. 11.

Figure 12:
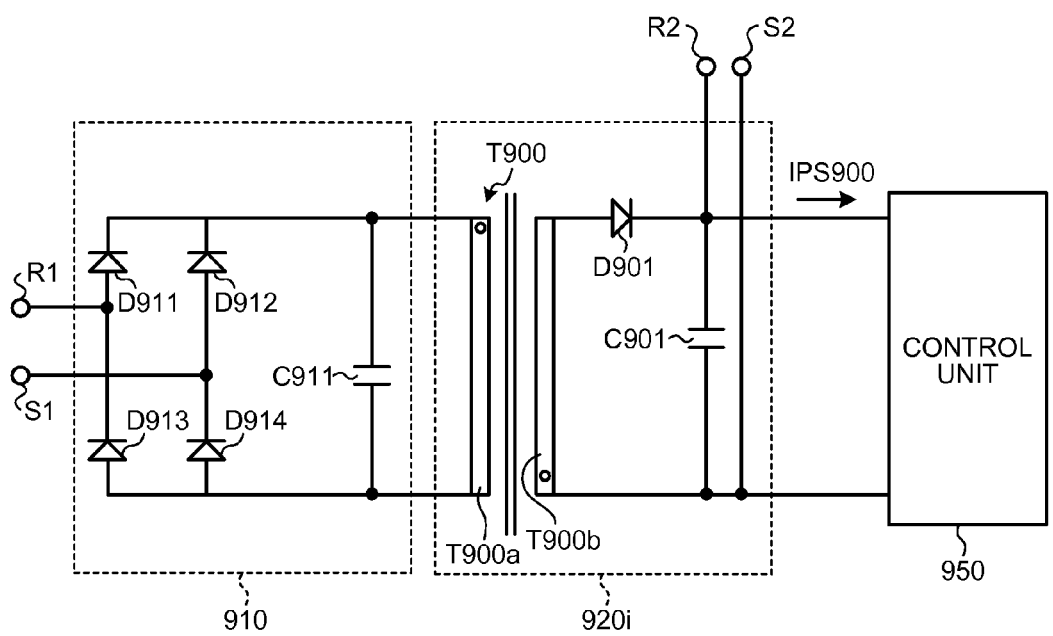
FIG. 12 is a diagram of the configuration of a rectifier circuit and a control power supply circuit in the modification of the basic mode.

That is, in the inverter device 900i according to a modification of the basic mode, input terminals R2 and S2 are added on a housing 902i. As shown in FIG. 12, the input terminal R2 is connected to one end of the control power supply capacitor C901 in a control power supply circuit 920i and the input terminal S2 is connected to the other end of the control power supply capacitor C901 in the control power supply circuit 920i. When the inventor examined the inverter device 900i, the inventor found that, in the inverter device 900i, it is difficult to achieve both of a supply system by the main power supply and a supply system by the external power supply at low cost and efficiently because of, for example, problems (1) to (5) explained below.

(1) To supply non-insulated control power (i.e., the direct-current power IPS900 for control), the external power supply DC also has to be insulated. Therefore, it takes cost and labor. It is difficult to use a non-insulated external power supply.

(2) When the control power (i.e., the direct-current power IPS900 for control) is generated by only the external power supply (e.g., DC 24 volts), compared with the main power supply (e.g., AC 200 volts/400 volts), it is necessary to feed a large current because a voltage is low. The external power supply DC having a large output is necessary.

(3) When direct-current power is supplied from the external power supply DC first, it is likely that a large rush current flows to the control power supply capacitor C901. To suppress the rush current, resistors only have to be provided between the input terminals R2 and S2 and the control power supply capacitor C901. However, a power loss occurs and efficiency is deteriorated.

(4) When the supply system by the main power supply (AC 200 volts/400 volts) and the supply system by the external power supply are simultaneously carried out, if the external power supply DC is a power supply for electricity storage such as a battery for electricity storage or a storage cell, energy saving is not attained and the power supply is inefficient.

(5) In the supply system by only the external power supply DC (i.e., a state in which the power supply by the main power supply is not performed), control for, for example, not driving the motor M is necessary in terms of safety. However, a method for the inverter device 900i to easily distinguish the supply system has not been established. Therefore, it is difficult to determine when the control for, for example, not driving the motor M should be performed.

Figure 1:
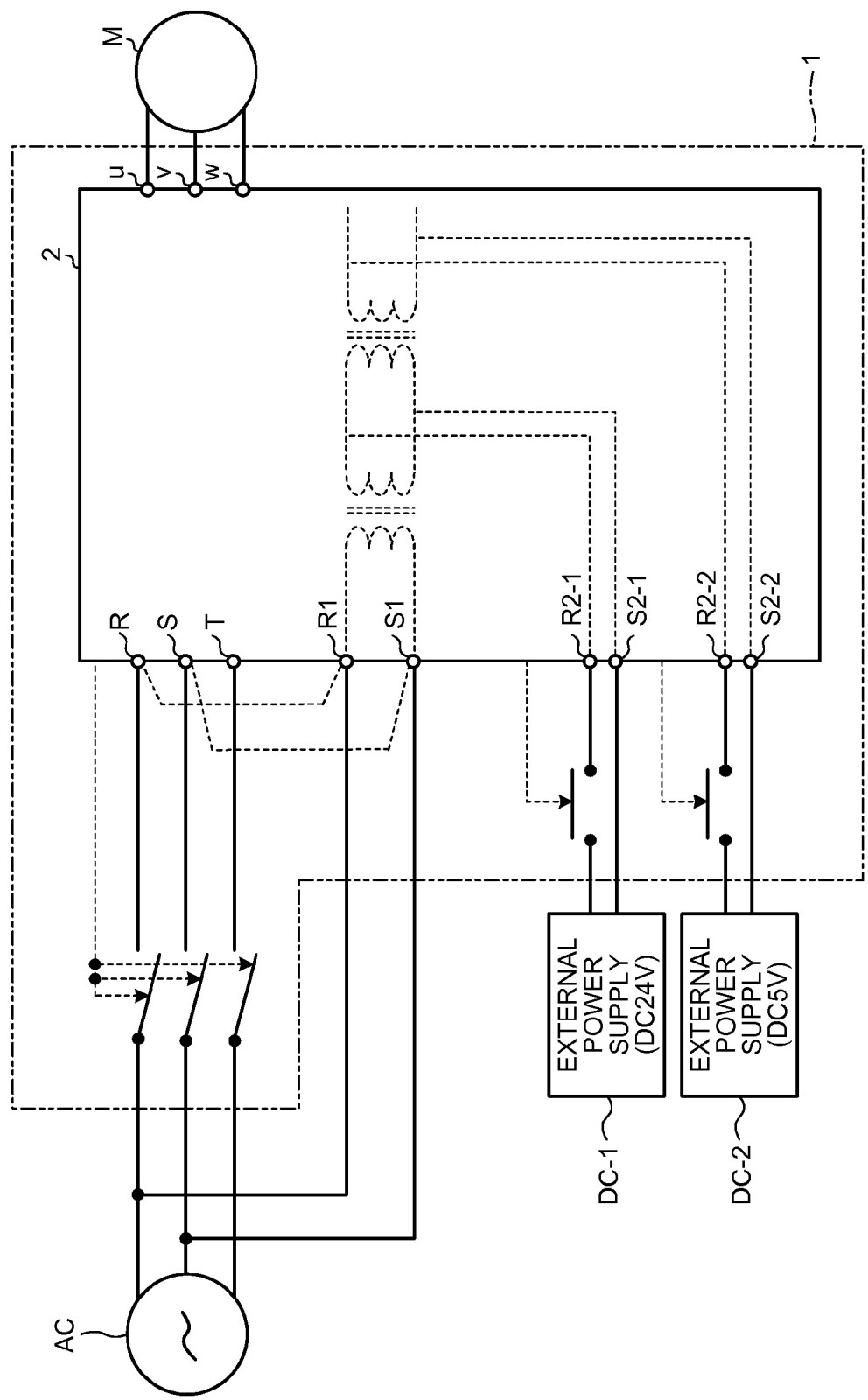
FIG. 1 is a diagram of the configuration of an inverter device according to a first embodiment.
Figure 2:
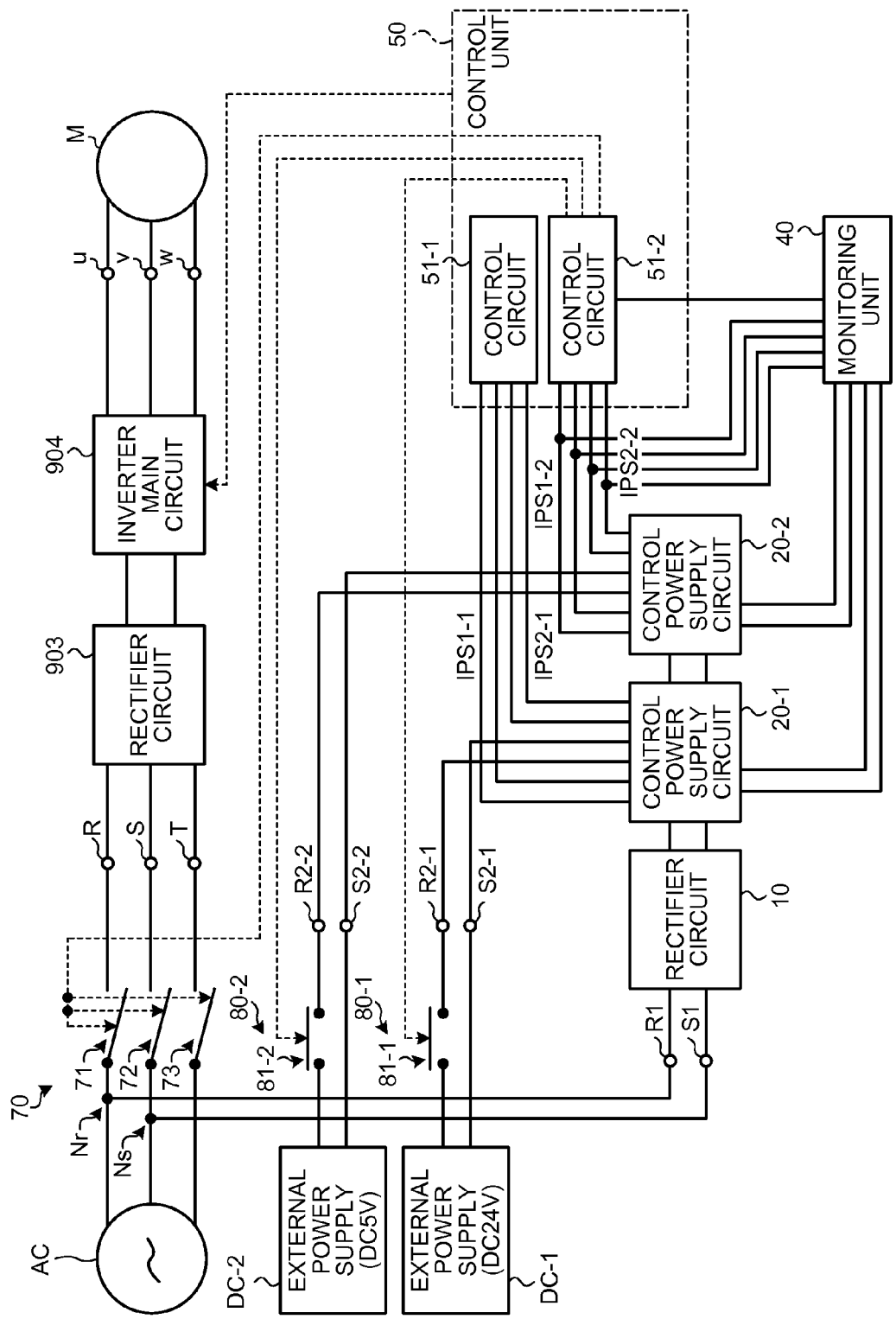
FIG. 2 is a diagram of the configuration of the inverter device according to the first embodiment.
Figure 3:
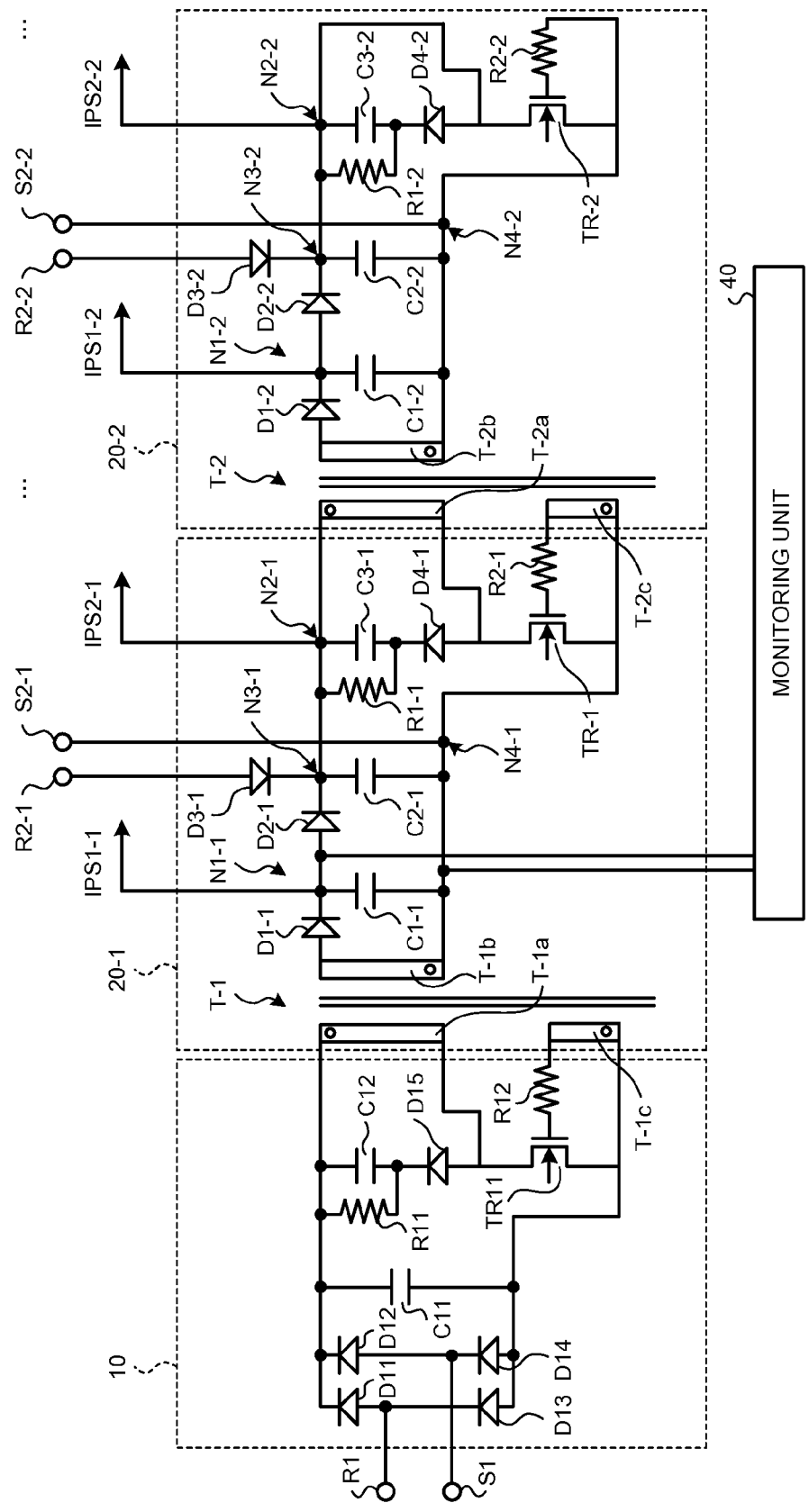
FIG. 3 is a diagram of the configuration of a rectifier circuit and a control power supply circuit in the first embodiment.

Therefore, in this embodiment, to solve the problems (1) to (5), the inverter device 900 according to the basic mode is improved as shown in FIG. 1 to FIG. 3. FIG. 1 is a diagram of the configuration of an inverter device 1 according to a first embodiment. FIG. 2 is a diagram of the more specific configuration of the inverter device 1 according to the first embodiment. FIG. 3 is a diagram of the configuration of a rectifier circuit 10 and control power supply circuits 20-1 and 20-2 in the first embodiment. In the following explanation, differences from the inverter device 900 according to the basic mode are mainly explained.

Specifically, in the housing 902 of the inverter device 900 shown in FIG. 9, as input terminals for establishing the control power, only the input terminals R1 and S1 for supplying the main power supply (AC 200/400 volts) are present. However, in this embodiment, as shown in FIG. 1, in a housing 2 of the inverter device 1, terminals R2-1 and S2-1 for supplying an external power supply DC-1 (e.g., DC 24 volts) and terminals R2-2 and S2-2 for supplying an external power supply DC-2 (e.g., DC 5 volts) are attached besides the input terminals R1 and S1 and a supply port exclusive for external power is set.

The inverter device 1 includes, as shown in FIG. 2 and FIG. 3, a rectifier circuit 10, a control power supply circuit 20-1, a control power supply circuit (a second control power supply circuit) 20-2, a monitoring unit 40, a control unit 50, a switching unit 70, a switching unit 80-1, and a switching unit 80-2. For example, the rectifier circuit 10, the control power supply circuit 20-1, the control power supply circuit (the second control power supply circuit) 20-2, the monitoring unit 40, and the control unit 50 are arranged inside the housing 2 of the inverter device 1. For example, the switching unit 70, the switching unit 80-1, and the switching unit 80-2 are arranged outside the housing 2 of the inverter 1.

The rectifier circuit 10 includes a plurality of diodes D11 to D14, a smoothing capacitor C11, a resistor R11, a capacitor C12, a diode D15, a transistor TR11, and a resistor R12. The diodes D11 to D14 are bridge-connected, and two middle points of the diodes D11 to D14 are respectively connected to the input terminals R1 and S1. At a post stage of the diodes D11 to D14, the smoothing capacitor C11 is connected between a P line and an N line. At a post stage of the smoothing capacitor C11, the resistor R11 and the capacitor C12 are connected in parallel between the P line and the cathode of the diode D15. The transistor TR11 is connected between the anode of the diode D15 and the N line. The resistor R12 is connected to the gate of the transistor TR11.

In the rectifier circuit 10, alternating-current power supplied from the input terminals R1 and S1 of the main power supply (AC 200/400 volts) is rectified by the diodes D11 to D14 to generate direct-current power. The direct-current power is then smoothed by the smoothing capacitor C11, and the smoothed direct-current power is output to the control power supply circuit 20-1 via the resistor R11, the capacitor C12, and the diode D15.

The control power supply circuit 20-1 includes an insulation transformer T-1, a diode D1-1, a control power supply capacitor C1-1, a diode D2-1, a diode D3-1, an external power supply capacitor C2-1, a resistor R1-1, a control power supply capacitor C3-1, a diode D4-1, a transistor TR-1, and a resistor R2-1. The insulation transformer T-1 includes a primary side winding wire T-1a connected to the rectifier circuit 10, a secondary side winding wire T-1b insulated from the primary side winding wire T-1a, and a tertiary side winding wire T-1c connected to the rectifier circuit 10. The anode of the diode D1-1 is connected to the primary side winding wire T-1$a$. The cathode of the diode D1-1 is connected to one end of the control power supply capacitor C1-1 via an output node N1-1. One end of the control power supply capacitor C1-1 is connected to the P line at the output node N1-1, and the other end of the control power supply capacitor C1-1 is connected to the N line.

The anode of the diode D2-1 is connected to the output node N1-1. The cathode of the diode D2-1 is connected to one end of the external power supply capacitor C2-1 via an input node N3-1. The anode of the diode D3-1 is connected to the input terminal R2-1. The cathode of the diode D3-1 is connected to one end of the external power supply capacitor C2-1 via the input node N3-1. One end of the external power supply capacitor C2-1 is connected to the P line at the input node N3-1, and the other end of the external power supply capacitor C2-1 is connected to the N line. The input terminal S2-1 is connected to an input node N4-1 on the N line. At a post stage of the external power supply capacitor C2-1, the resistor R1-1 and the control power supply capacitor C3-1 are connected in parallel between the P line and the cathode of the diode D4-1. The transistor TR-1 is connected between the anode of the diode D4-1 and the N line. The resistor R2-1 is connected to the gate of the transistor TR-1.

The control power supply circuit 20-1 receives, in the primary side winding wire T-1$a$ of the insulation transformer T-1, direct-current power output from the rectifier circuit 10, transforms the direct-current power according to a turn ratio of the primary side winding wire T-1$a$ and the secondary side winding wire T-1$b$ (e.g., steps down the direct-current power from 200/400 volts to 24 volts), and generates transformed direct-current power. The control power supply capacitor C1-1 receives the direct-current power from the secondary side winding wire T-1$b$ via the diode D1-1 and accumulates charges corresponding to the received direct-current power. The control power supply capacitor C1-1 supplies electric power corresponding to the accumulated charges from the output node N1-1 to, for example, a control circuit 51-1 in the control unit 50 and the monitoring unit 40 as insulated internal power supply, that is, direct-current power IPS1-1 (e.g., 24 volts) for control.

The external power supply capacitor C2-1 performs at least one of reception of direct-current power (e.g., 24 volts) from the control power supply capacitor C1-1 via the diode D2-1 and the input node N3-1 and reception of direct-current power (e.g., 24 volts) from the external power supply DC-1 via the input terminal R2-1, the diode D3-1, and the input node N3-1, and accumulates charges corresponding to the received direct-current power. The external power supply capacitor C2-1 supplies electric power corresponding to the accumulated charges to the control power supply capacitor C3-1 via the input node N3-1 and the output node N2-1. The control power supply capacitor C3-1 receives the direct-current power from the external power supply capacitor C2-1 via the input node N3-1 and the output node N2-1 and accumulates charges corresponding to the received direct-current power. The control power supply capacitor C3-1 supplies electric power corresponding to the accumulated charges from the output node N2-1 to, for example, a control circuit 51-2 in the control unit 50 as an insulated internal power supply, that is, direct-current power IPS2-1 for control (e.g., 24 volts).

Because the diode D2-1, the diode D3-1, and the external power supply capacitor C2-1 are added, an internal power supply IPS1-1 (main power supply) and an internal power supply IPS2-1 (the main power supply+external DC power supply) can be separated, so that the problem (2) can be solved.

If the internal power supply IPS1-1 (the main power supply) and the internal power supply IPS2-1 (the main power supply+the external DC power supply) are not separated, all power has to be supplied by an external power supply. Therefore, an external power supply having a large output is made necessary.

Contrary to this, in this embodiment, the internal power supply IPS1-1 (the main power supply) and the internal power supply IPS2-1 (the main power supply+the external DC power supply) are separated. Devices that require large electric power (e.g., a fan) and devices that do not need to be driven by the external power supply (other than peripheral devices of a CPU) are driven by the separated internal power supply IPS1-1. Consequently, it is made possible to reduce power to be supplied from the external power supply DC-1 and reduce an electric current.

The external power supply capacitor C2-1 that receives power supply from the external power supply DC-1 is provided separately from the control power supply capacitor C1-1 that receives power supply from the main power supply via the rectifier circuit 10. Therefore, it is possible to reduce the capacity of the external power supply capacitor C2-1. It is possible to solve the problem (3).

If the control power supply capacitor C1-1 and the external power supply capacitor C2-1 are provided in common, the capacity of the capacitor has to be increased to stably receive power supply from the main power supply via the rectifier circuit 10. It is likely that a large rush current flows from the external power supply DC-1 to the capacitor.

On the other hand, in this embodiment, a capacitor is divided into the control power supply capacitor C1-1 and the external power supply capacitor C2-1. Therefore, it is possible to reduce the capacity of the external power supply capacitor C2-1 and reduce a rush current from the external power supply DC-1 to the external power supply capacitor C2-1.

The control power supply circuit 20-2 includes an insulation transformer T-2, a diode D1-2, a control power supply capacitor C1-2, a diode D2-2, a diode D3-2, an external power supply capacitor C2-2, a resistor R1-2, a control power supply capacitor C3-2, a diode D4-2, a transistor TR-2, and a resistor R2-2. In the control power supply circuit 20-2, the insulation transformer T-2 includes a primary side winding wire T-2$a$ connected to the control power supply circuit 20-1, a secondary side winding wire T-2$b$ insulated from the primary side winding wire T-2$a$, and a tertiary side winding wire T-2$c$ connected to the control power supply circuit 20-1. An output node N2-2 and the anode of the diode D4-2 are connected. One end of the resistor R2-2 is connected to a gate of the transistor TR-2. The other end of the resistor R2-2 is connected to the source (or the drain) of the transistor TR-2. The configuration of the other devices is the same as the configuration of the devices in the control power supply circuit 20-1.

The control power supply circuit 20-2 transforms direct-current power output from the control power supply circuit 20-1 according to a turn ratio of the primary side winding wire T-2$a$ and the secondary side winding wire T-2$b$ (e.g., steps down the direct-current power from 24 volts to 5 volts) and generates transformed direct-current power. The control power supply capacitor C1-2 supplies electric power corresponding to accumulated charges from the output node N1-2 to, for example, the control circuit 51-2 in the control unit 50 as insulated internal power, that is, direct-current power IPS1-2 (e.g., 5 volts) for control. The external power supply capacitor C2-2 performs at least one of reception of direct-current power (e.g., 5 volts) from the control power supply capacitor C1-2 via the diode D2-2 and the input node N3-2 and reception of direct-current power (e.g., 5 volts) from the external power supply DC-2 via the input terminal R2-2, the diode D3-2, and the input node N3-2, and accumulates charges corresponding to the received direct-current power. The external power supply capacitor C3-2 supplies electric power corresponding to the accumulated charges from the output node N2-2 to, for example, the control circuit 51-2 in the control unit 50 as insulated internal power, that is, direct-current power IPS2-2 (e.g., 5 volts) for control. The other operation of the control power supply circuit 20-2 is the same as the operation of the control power supply circuit 20-1.

The insulated internal power supply IPS1-2 is supplied by the internal power supply IPS2-1 (the main power supply+the external DC power supply) and the insulation transformer T-2. Therefore, even if electric power is supplied by a non-insulated external power supply, it is possible to supply an insulated internal power supply, so that it is made possible to solve the problem (1).

The monitoring unit 40 receives one of the direct-current power IPS1-1 and the direct-current power IPS2-1 (e.g., 24 V each) for control from the control power supply circuit 20-1, operates using the received direct-current power IPS1-1 or IPS2-1 for control, and monitors the voltage of the control power supply capacitor C1-1. The monitoring unit 40 supplies a value of the monitored voltage to (e.g., the control circuit 51-2 in) the control unit 50 as a monitoring result.

The control unit 50 receives one of the direct-current power IPS1-1 and the direct-current power IPS2-1 (e.g., 24 volts each) for control from the control power supply circuit 20-1 and receives one of the direct-current power IPS1-2 and the direct-current power IPS2-2 (e.g., 5 volts each) for control from the control power supply circuit 20-2. The control unit 50 performs a predetermined control operation using received direct-current power IPS1-1 or IPS2-1 for control and the received direct-current power IPS1-2 or IPS2-2 for control.

Specifically, the control unit 50 includes a plurality of control circuits 51-1 and 51-2. The control circuit 51-1 includes circuit components that operate at a relatively high voltage. The control circuit 51-1 receives one of the direct-current power IPS1-1 and the direct-current power IPS2-1 (e.g., 24 volts each) for control from the control power supply circuit 20-1 and performs the predetermined control operation using the received direct-current power IPS1-1 or IPS2-1 for control.

The control circuit 51-2 includes circuit components that operate at a relatively low voltage. The control circuit 51-2 receives one of the direct-current power IPS1-2 and the direct-current power IPS2-2 (e.g., 5 volts each) for control from the control power supply circuit 20-2 and performs the predetermined control operation using the received direct-current power IPS1-2 or IPS2-2 for control.

The switching unit 70 is connected, for example, between the main power supply AC and the input terminals R, S, and T. The switching unit 70 switches the electrical connection between the main power supply AC and the rectifier circuit 903 under the control by the control unit 50. The switching unit 70 includes, for example, a plurality of switches 71 to 73 that turn on and off in synchronization with one another. The switching unit 70 turns on and off electric connections of the main power supply AC and the input terminals R, S, and T in synchronization with one another according to a control signal supplied from the control circuit 51-2 to switch the electrical connection between the main power supply AC and the rectifier circuit 903.

The switching unit 80-1 is connected, for example, between the external power supply DC-1 and the input terminals R2-1 and S2-1. The switching unit 80-1 switches the electrical connection between the external power supply DC-1 and the control power supply circuit 20-1 under the control by the control unit 50. The switching unit 80-1 includes a breaker 81-1 (e.g., a relay) that interrupts, for example, the electrical connection between the external power supply DC-1 and the input terminal R2-1. The switching unit 80-1 interrupts the electrical connection between the main power supply AC and the input terminals R, S, and T and releases the interruption according to a control signal (an interruption signal or an energization signal) supplied from the control circuit 51-2 to switch the electrical connection between the external power supply DC-1 and the control power supply circuit 20-1.

The switching unit 80-2 is connected, for example, between the external power supply DC-2 and the input terminals R2-2 and S2-2. The switching unit 80-2 switches the electrical connection between the external power supply DC-2 and the control power supply circuit 20-2 under the control by the control unit 50. The switching unit 80-2 includes a breaker 81-2 (e.g., a relay) that interrupts, for example, the electrical connection between the external power supply DC-2 and the input terminal R2-2. The switching unit 80-2 interrupts the electrical connection between the main power supply AC and the input terminals R, S, and T and releases the interruption according to a control signal (an interruption signal or an energization signal) supplied from the control circuit 51-2 to switch the electrical connection between the external power supply DC-2 and the control power supply circuit 20-2.

For example, the control circuit 51-2 receives the monitoring result of the voltage of the control power supply capacitor C1-1 from the monitoring unit 40. The control circuit 51-2 switches, according to the monitoring result by the monitoring unit 40, the operation of the inverter device 1 among a first mode for cutting off the external power supplies DC-1 and DC-2 from the control power supply circuits 20-1 and 20-2, a second mode for using both of the main power supply AC and the external power supplies DC-1 and DC-2, and a third mode for cutting off the main power supply AC from the rectifier circuit 903.

Specifically, the control circuit 51-2 controls the switching unit 70, the switching unit 80-1, and the switching unit 80-2 according to the monitoring result by the monitoring unit 40. For example, in the first mode, the control circuit 51-2 controls the switching unit 70 to switch the electrical connection between the main power supply AC and the rectifier circuit 903 to a closed state, controls the switching unit 80-1 to switch the electrical connection between the external power supply DC-1 and the control power supply circuit 20-1 to an open state, and controls the switching unit 80-2 to switch the electrical connection between the external power supply DC-2 and the control power supply circuit 20-2 to the open state. Further, for example, in the second mode, the control circuit 51-2 controls the switching unit 70 to switch the electrical connection between the main power supply AC and the rectifier circuit 903 to the closed state, controls the switching unit 80-1 to switch the electrical connection between the external power supply DC-1 and the control power supply circuit 20-1 to the closed state, and controls the switching unit 80-2 to switch the electrical connection between the external power supply DC-2 and the control power supply circuit 20-2 to the closed state. For example, in the third mode, the control circuit 51-2 controls the switching unit 70 to switch the electrical connection between the main power supply AC and the rectifier circuit 903 to the open state, controls the switching unit 80-1 to switch the electrical connection between the external power supply DC-1 and the control power supply circuit 20-1 to the closed state, and controls the switching unit 80-2 to switch the electrical connection between the external power supply DC-2 and the control power supply circuit 20-2 to the closed state.

Figure 4:
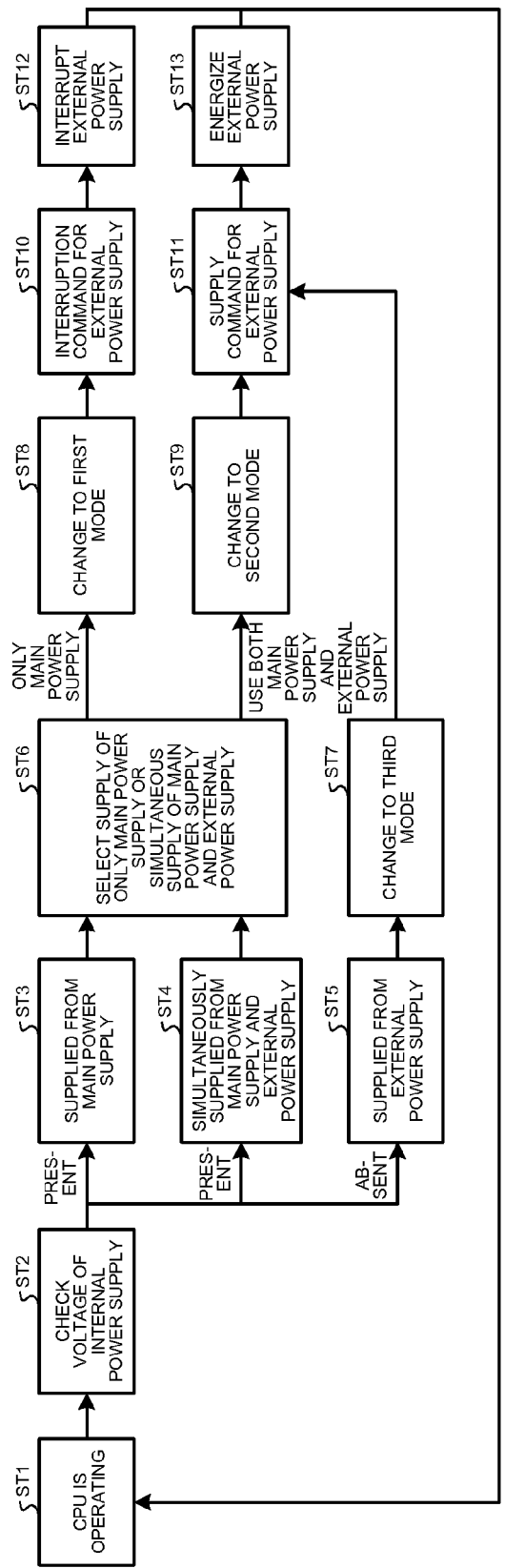
FIG. 4 is a diagram of the operation of the inverter device according to the first embodiment.

That is, the monitoring unit 40 monitors the voltage of the control power supply capacitor C1-1. The control unit 50 distinguishes, according to a result of the monitoring, whether the present power supply state is supply by a main power supply (AC 200 volts/400 volts) system or supply by an external power supply system to solve the problems (4) and (5) as shown in FIG. 4. FIG. 4 is a diagram of an algorithm for distinguishing the present power supply state.

As shown in FIG. 4, first, electric power is supplied and the CPU (not shown in the figure) including the monitoring unit 40 and the control unit 50 operates (step ST1). Subsequently, the CPU detects the voltage of the separated control power supply capacitor C1-1 and, for example, compares the voltage with a predetermined threshold to determine whether the voltage of the control power supply capacitor C1-1 is present (step ST2). When it is determined that the voltage of the control power supply capacitor C1-1 is present, it can be seen that the electric power is supplied from the main power supply AC (steps ST3 and ST4). When it is determined that the voltage of the control power supply capacitor C1-1 is not present, it can be seen that the electric power is supplied from the external power supply DC-1 (step ST5). Consequently, it is possible to distinguish a supply port of the electric power and change the control mode of the inverter device 1.

When it can be seen that the electric power is supplied from the main power supply AC (steps ST3 and ST4), the CPU inquires the user whether the power supply of only the main power supply is used or both of the main power supply and the external power supply are used. The CPU waits for an instruction for selection concerning whether the power supply of only the main power supply is used or both of the main power supply and the external power supply are used (step ST6).

When the system of only the main power supply (set from a parameter or an external input) is selected, the CPU changes the control mode of the inverter device 1 to the first mode (step ST8). Consequently, when the power supply is simultaneously performed by the main power supply AC and the external power supply DC-1, it is possible to interrupt the unnecessary external power supply system and attain power saving of the external power supply (a battery, a cell, etc.), and it is possible to solve the problem (4).

Figure 5:
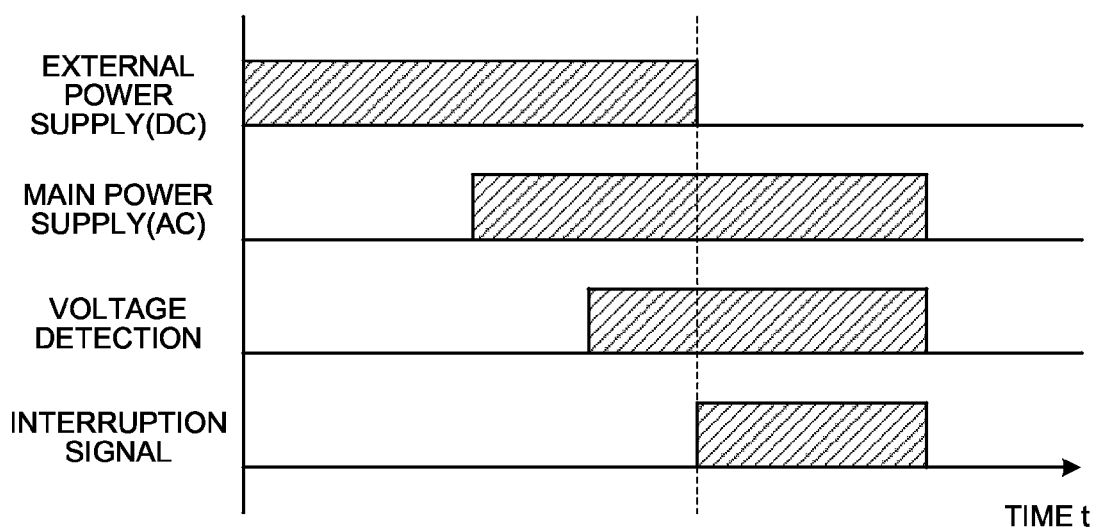
FIG. 5 is a diagram of the operation of the inverter device according to the first embodiment.

As an interruption method, for example, the control unit 50 outputs an interruption signal to the breakers 81-1 and 81-2 (step ST10) and interrupts the external power supply system with the breakers 81-1 and 82-1 on the outside of the housing 2 (step ST12). FIG. 5 is a time chart of the interruption method. An example is shown in which the CPU starts operation with the external power supply DC-1 and, when the electric power is supplied by the main power supply AC, the CPU detects the voltage of the control power supply capacitor C1-1 and outputs the interruption signal.

When a system for using both of the main power supply and the external power supply (set from a parameter or an external input) is selected, the CPU changes the control mode of the inverter device 1 to the second mode (step ST9). In the second mode, the control unit 50 outputs an energization signal to the breakers 81-1 and 81-2 (step ST11). The breakers 81-1 and 81-2 outside the housing 2 release the interruption (step ST13). For example, the second mode is a high reliability mode in which, even when the main power supply AC is turned off due to some reason, a power supply of the CPU is not cut and the CPU can grasp, determine, and record a situation. In this case, for example, if direct-current power is supplied from the control power supply circuit 20-1 to the inverter main circuit 904, it is possible to continue the operation of driving of the motor M.

Further, when the main power supply AC is turned off by an instantaneous power failure, a power failure, or the like, according to the algorithm shown in FIG. 4, it can be seen that the electric power is supplied from the external power supply DC-1 (step ST5). Therefore, the control mode of the inverter device 1 is changed to the third mode (step ST7). Consequently, it is possible to resume the power supply to the CPU. In this case, the CPU can record the instantaneous power failure, the power failure, or the like. The third mode is a system for using both of the main power supply and the external power supply. It is possible to easily check a setting change of the inverter device 1 and a state of the inverter device 1 without turning on the main power supply AC, and thus it is made possible to improve convenience and maintainability of the inverter device 1. A high voltage (equal to or higher than 100 volts to 200 volts) is unnecessary. The state of the inverter device 1 can be safely checked and it is unnecessary feed an electric current to the inverter main circuit 904. Therefore, it is made possible to attain power saving. It is also possible to check the state of the inverter device 1 from a remote place using communication such as CC-LINK. Further, an operation such as driving of the motor M is made impossible and functions are automatically limited. Therefore, it is made possible to secure safety concerning the driving of the motor M, and solve the problem (5).

As explained above, in the first embodiment, in the control power supply circuit 20-1, the insulation transformer T-1 includes the primary side winding wire T-1a connected to the rectifier circuit 10 and the secondary side winding wire T-1b insulated from the primary side winding wire T-1a. The control power supply capacitor C1-1 is connected to the secondary side winding wire T-1b of the insulation transformer T-1 via the diode D1-1. The external power supply capacitor C2-1 is connected to the control power supply capacitor C1-1 via the diode D2-1 and connected to the input terminal R2-1, to which the external power supply DC-1 is connected, via the diode D3-1. The control power supply capacitor C3-1 is connected to the external power supply capacitor C2-1. Consequently, it is possible to separate the internal power supply IPS1-1 (the main power supply) and the internal power supply IPS2-1 (the main power supply+the external DC power supply), reduce the power to be supplied from the external power supply DC-1, and attain power saving. The capacitor is divided into the control power supply capacitor C1-1 and the external power supply capacitor C2-1. Consequently, it is made possible to reduce the capacity of the external power supply capacitor C2-1 and reduce a rush current from the external power supply DC-1 to the external power supply capacitor C2-1. Therefore, it is possible to efficiently suppress the rush current without providing a resistor. Therefore, it is possible to achieve both of the power supply by the main power supply and the power supply by the external power supply in a power-saving and efficient manner.

Further, In the first embodiment, in the control ipower supply circuit 20-2, the insulation transformer T-2 includes the primary side winding wire T-2a connected to the rectifier circuit 10 and the secondary side winding wire T-2b insulated from the primary side winding wire T-2a. The control power supply capacitor C1-2 is connected to the secondary side winding wire T-2b of the insulation transformer T-2 via the diode D1-2. The external power supply capacitor C2-2 is connected to the control power supply capacitor C1-2 via the diode D2-2 and connected to the input terminal R2-2, to which the external power supply DC-2 is connected, via the diode D3-2. The control power supply capacitor C3-2 is connected to the external power supply capacitor C2-2. Consequently, the insulated internal power supply IPS1-2 is supplied by the internal power supply IPS2-1 (the main power supply+the external DC power supply) and the insulation transformer T-2. Therefore, when power supply is performed by a non-insulted external power supply, it is possible to supply insulated internal power without insulating the external power supply DC. As a result, it is possible to achieve both of the power supply by the main power supply and the power supply by the external power supply at low cost.

Still further, in the first embodiment, in the inverter device 1, the monitoring unit 40 monitors the voltage of the control power supply capacitor C1-1. The control unit 50 switches, according to a monitoring result by the monitoring unit 40, the operation of the inverter device 1 among the first mode for cutting off the external power supplies DC-1 and DC-2 from the control power supply circuits 20-1 and 20-2, the second mode for using both of the main power supply AC and the external power supplies DC-1 and DC-2, and the third mode for cutting off the main power supply AC from the rectifier circuit 903. Consequently, it is possible to automatically distinguish a power supply port (the main power supply/the external power supply) and change the control mode of the inverter device 1 according to a supply system and a purpose (setting) of the inverter device 1. For example, by changing the control mode to the first mode, it is made possible to interrupt the external power supply when both of the main power supply and the external power supply are used and attain power saving of a battery or the like of the external power supply. Alternatively, by changing the control mode to the second mode, it is possible to improve the reliability of the operation of the inverter device 1 to prevent the power supply of the CPU (the monitoring unit 40 and the control unit 50) from being turned off at all times. Alternatively, for example, by changing the control mode to the third mode, a restriction for, for example, not driving the motor M is automatically applied, and it is made possible to safely set and maintain the inverter device 1.

Second Embodiment

Figure 6:
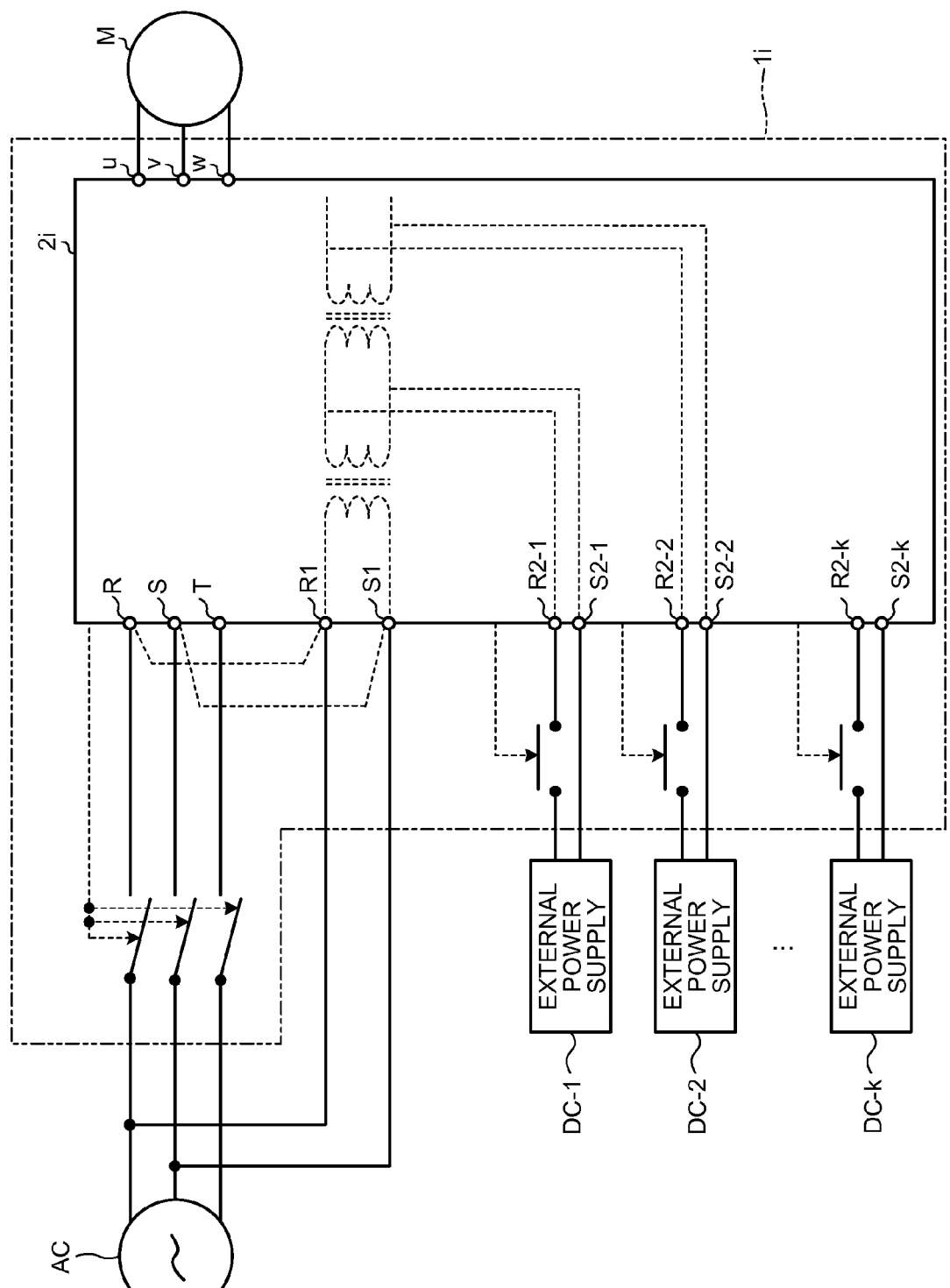
FIG. 6 is a diagram of the configuration of an inverter device according to a second embodiment.

An inverter device 1$i$ according to a second embodiment is explained with reference to FIG. 6. FIG. 6 is a diagram of the configuration of the inverter device 1$i$. In the following explanation, differences from the first embodiment are mainly explained.

In the first embodiment, the two kinds of external power supplies DC-1 and DC-2 are connected to the inverter device 1. However, in the second embodiment, various kinds of external power supplies DC-1, DC-2, . . . , and DC-k (k is an integer equal to or larger than 3) are connected to the inverter device 1$i$.

Specifically, in the housing 2$i$ of the inverter device 1$i$, as input terminals for establishing a control power supply, besides the input terminals R1 and S1, the terminals R2-1 and S2-1 for supplying the external power supply DC-1 and the terminals R2-2 and S2-2 for supplying the external power supply DC-2 are attached and terminals R2-k and S2-k for supplying an external power supply DC-k are attached, and a supply port exclusively for the external power supplies is set.

Figure 7:
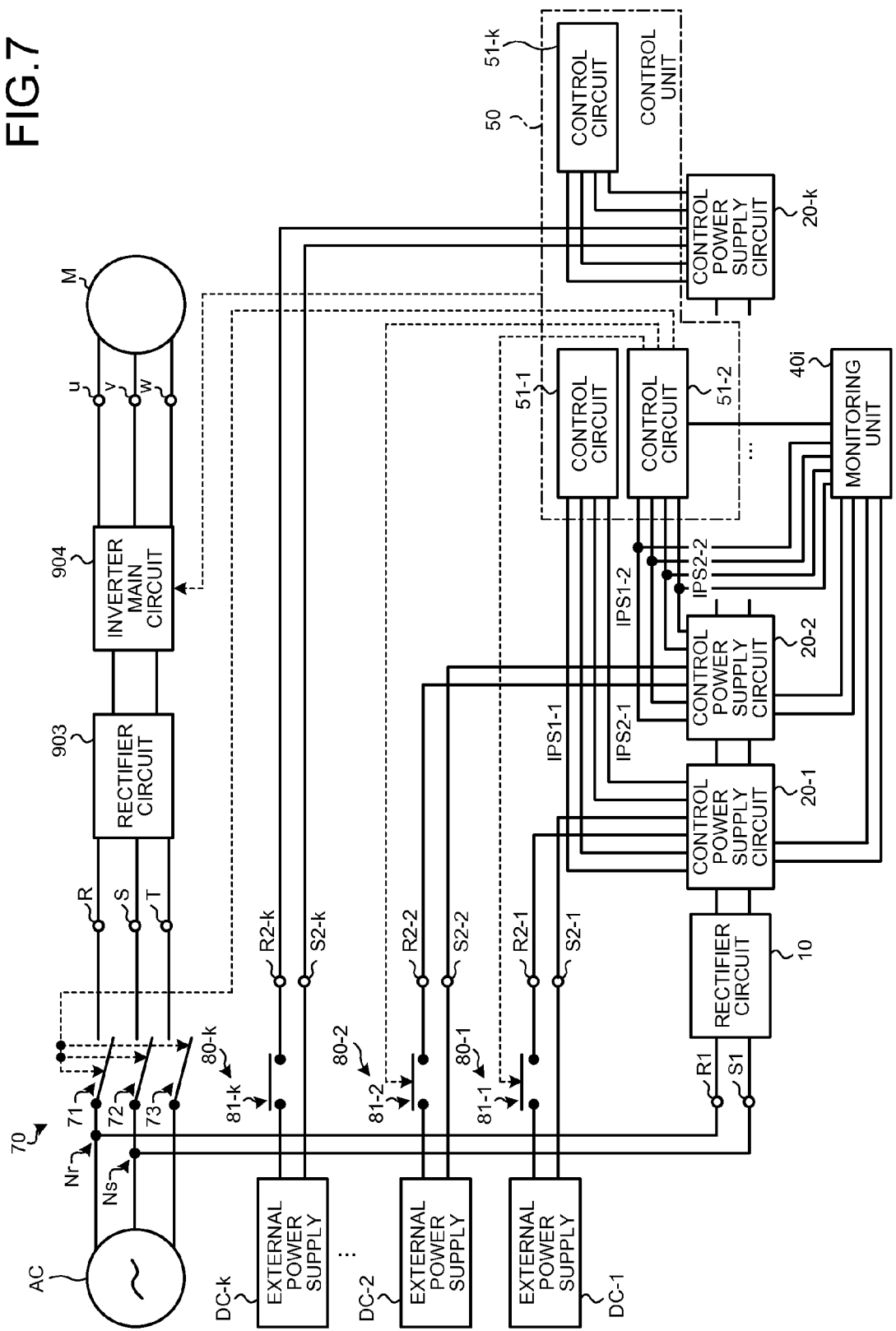
FIG. 7 is a diagram of the configuration of the inverter device according to the second embodiment.
Figure 8:
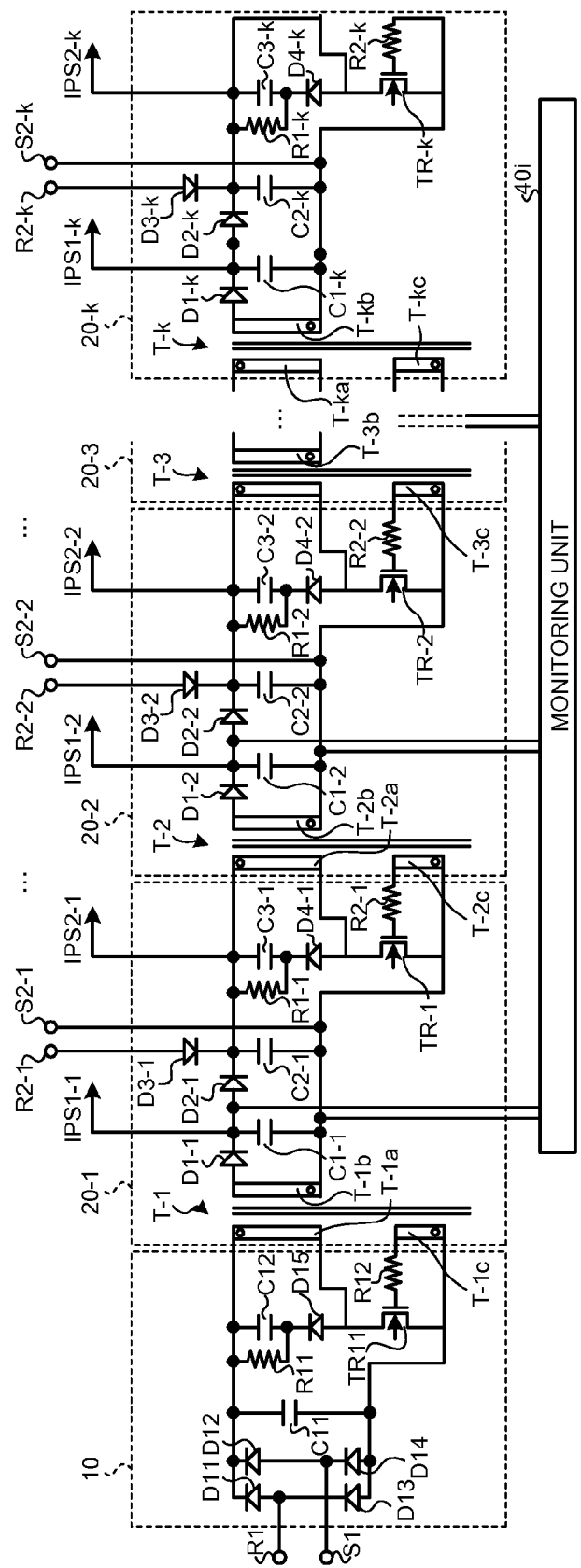
FIG. 8 is a diagram of the configuration of a rectifier circuit and a control power supply circuit in the second embodiment.

More specifically, in the inverter device 1$i$, as shown in FIGS. 7 and 8, the control power supply circuit 20-1, the control power supply circuit 20-2, . . . , and the control power supply circuit 20-k are connected in multiple stages using a plurality of insulation transformers T-1, T-2, . . . , and T-k. In this case, each of the internal configurations of the control power supply circuit 20-1, the control power supply circuit 20-2, . . . , and the control power supply circuit 20-(k−1) excluding the last stage is the same as the internal configuration of the control power supply circuit 20-1 in the first embodiment. The internal configuration of the control power supply circuit 20-k in the last stage is the same as the internal configuration of the control power supply circuit 20-2 in the first embodiment. Consequently, it is made possible to generate insulated internal power supplies, that is, direct-current power supplies for control IPS1-1, IPS2-1, IPS1-2, IPS2-2, . . . , IPS1-k, and IPS2-k at levels transformed in multiple stages (e.g., DC 48 volts, DC 24 volts, DC 5 volts, and DC 3.3 volts). When control circuits 51-1, 51-2, . . . , and 51-k that operate with different levels of electric power are present in the control unit 50, it is possible to supply insulated internal power supplies to the respective control circuits.

A monitoring unit 40$i$ monitors the voltages of control power supply capacitors C1-1, C1-2, . . . , and C1-(k−1) in the control power supply circuit 20-1, the control power supply circuit 20-2, . . . , and the control power supply circuit 20-(k−1) excluding the last stage. The monitoring unit 40$i$ supplies values of the monitored voltages to (for example, the control circuit 51-2 in) the control unit 50 as a monitoring result.

For example, the control circuit 51-2 receives a monitoring result of the voltage of the control power supply capacitor C1-1, the voltage of the control power supply capacitor C1-2, . . . , and the voltage of the control power supply capacitor C1-k from the monitoring unit 40$i$. The control circuit 51-2 switches, according to the monitoring result by the monitoring unit 40$i$, the operation of the inverter device 1$i$ among the first mode for cutting off the external power supplies DC-1, DC-2, . . . , and DC-k from the control power supply circuits 20-1 and 20-2, the second mode for using both of the main power supply AC and the external power supplies DC-1, DC-2, . . . , and DC-k, and the third mode for cutting off the main power supply AC from the rectifier circuit 903. The control circuit 51-2 controls the switching unit 70, the switching unit 80-1, the switching unit 80-2, . . . , and a switching unit 80-k according to the monitoring result by the monitoring unit 40$i$. Consequently, it is possible to automatically distinguish a power supply port (the main power supply/the external power supply) in multiple stages and more accurately change the control mode of the inverter device 1$i$ according to a supply system and a purpose (setting) of the inverter device 1$i$.

Note that it is possible to automatically distinguish the power supply port (the main power supply/the external power supply) in multiple stages according to the monitoring result by the monitoring unit 40$i$. Therefore, the control circuit 51-2 can switch the operation of the inverter device 1$i$ among a larger number of control modes. For example, a mode for cutting off a part of the external power supplies DC-1, DC-2, . . . , and DC-k from the control power supply circuits 20-1 and 20-2 can be further provided. A mode for using both of the main power supply AC and a part of the external power supplies DC-1, DC-2, . . . , and DC-k can be further provided. Consequently, it is possible to cause the inverter device 1$i$ to more finely operate according to a supply system and a purpose (setting) of the inverter device 1$i$.

INDUSTRIAL APPLICABILITY

As explained above, the inverter device according to the present invention is useful for establishing a control power supply.

REFERENCE SIGNS LIST 1, 1i Inverter devices
2 Housing
10 Rectifier circuit
20-1 to 20-k Control power supply circuits
40, 40i Monitoring units
50 Control unit
51-1 to 51-k Control circuits
70 Switching unit
71 to 73 Switches
80-1 to 80-k Switching units
81-1 to 81-k Breakers
900, 900i Inverter devices
902, 902i Housings
903 Rectifier circuit
904 Inverter main circuit
910 Rectifier circuit
920, 920i Control power supply circuits
950 Control unit
AC Main power supply
C1-1 to C1-k Control power supply capacitors
C2-1 to C2-k External power supply capacitors
C3-1 to C3-k Control power supply capacitors
D1-1 to D1-k Diodes
D2-1 to D2-k Diodes
D3-1 to D3-k Diodes
DC External power supply
DC-1 to CD-k External power supplies
T-1 to T-k Insulation transformers
T-1a to T-ka Primary side winding wires
T-1b to T-kb Secondary side winding wires
T900 Insulation transformer
T900a Primary side winding wire
T900b Secondary side winding wire

The invention claimed is:

1. An inverter device comprising:
  a rectifier circuit that rectifies alternating-current power supplied from a main power supply and generates direct-current power;
  a control power supply circuit that generates direct-current power for control using at least one of the generated direct-current power and direct-current power supplied from an external power supply;
  a control unit that performs a predetermined control operation using the generated direct-current power for control; and
  a monitoring unit, wherein
  the control power supply circuit includes:
    an insulation transformer including a primary side winding wire connected to the rectifier circuit and a secondary side winding wire insulated from the primary side winding wire;
    a first control power supply capacitor connected to the secondary side winding wire of the insulation transformer via a first diode;
    an external power supply capacitor connected to the first control power supply capacitor via a second diode and connected to a terminal, to which the external power supply is connected, via a third diode; and
    a second control power supply capacitor connected to the external power supply capacitor, and wherein
  the monitoring unit monitors a voltage of the first control power supply capacitor, and
  the control unit compares the voltage of the first control power supply capacitor monitored by the monitoring unit with a threshold, and when it is found that electric current is supplied from the main power supply, inquires of a user whether the user selects a first mode for performing power supply using the first control power supply capacitor or a second mode for performing the power supply using the second control power supply capacitor, and switches an operation between the first mode and the second mode according to a selection instruction from the user.

2. The inverter device according to claim 1, further comprising a second control power supply circuit that generates second direct-current power for control using at least one of the generated direct-current power for control and direct-current power supplied from a second external power supply, wherein
  the control unit performs a predetermined control operation using the generated direct-current power for control and the generated second direct-current power for control, and
  the second control power supply circuit includes:
    a second insulation transformer including a primary side winding wire connected to the second control power supply capacitor and a secondary side winding wire insulated from the primary side winding wire;
    a third control power supply capacitor connected to the secondary side winding wire of the second insulation transformer via a fourth diode;
    a second external power supply capacitor connected to the third control power supply capacitor via a fifth diode and connected to a terminal, to which the second external power supply is connected, via a sixth diode; and
    a fourth control power supply capacitor connected to the second external power supply capacitor.

3. The inverter device according to claim 1, further comprising:
  a second rectifier circuit that rectifies the alternating-current power supplied from the main power supply and generates direct-current power; and
  an inverter main circuit that converts the direct-current power generated by the second rectifier circuit into alternating-current power and drives a motor using the converted alternating-current power, wherein
  the control unit switches, according to a monitoring result by the monitoring unit, an operation of the inverter device among the first mode for cutting off the external power supply from the control power supply circuit, the second mode for using both of the main power supply and the external power supply, and a third mode for cutting off the main power supply from the second rectifier circuit.

4. The inverter device according to claim 3, further comprising:
  a first switching unit that switches electrical connection between the main power supply and the second rectifier circuit; and
  a second switching unit that switches electrical connection between the external power supply and the control power supply circuit, wherein
  the control unit controls the first switching unit and the second switching unit according to a monitoring result by the monitoring unit.

5. The inverter device according to claim 2, further comprising:
  a second rectifier circuit that rectifies the alternating-current power supplied from the main power supply and generates direct-current power; and an inverter main circuit that converts the direct-current power generated by the second rectifier circuit into alternating-current power and drives a motor using the converted alternating-current power, wherein the monitoring unit monitors a voltage of the first control power supply capacitor, and the control unit switches, according to a monitoring result by the monitoring unit, an operation of the inverter device among the first mode for cutting off the external power supply from the control power supply circuit and cutting off the second external power supply from the second control power supply circuit, the second mode for using all of the main power supply, the external power supply, and the second external power supply, and a third mode for cutting off the main power supply from the second rectifier circuit.

6. The inverter device according to claim 5, further comprising:

a first switching unit that switches electrical connection between the main power supply and the second rectifier circuit;

a second switching unit that switches electrical connection between the external power supply and the control power supply circuit; and a third switching unit that switches electrical connection between the second external power supply and the second control power supply circuit, wherein the control unit controls the first switching unit, the second switching unit, and the third switching unit according to a monitoring result by the monitoring unit.

* * * * *